UNITED STATES PATENT OFFICE.

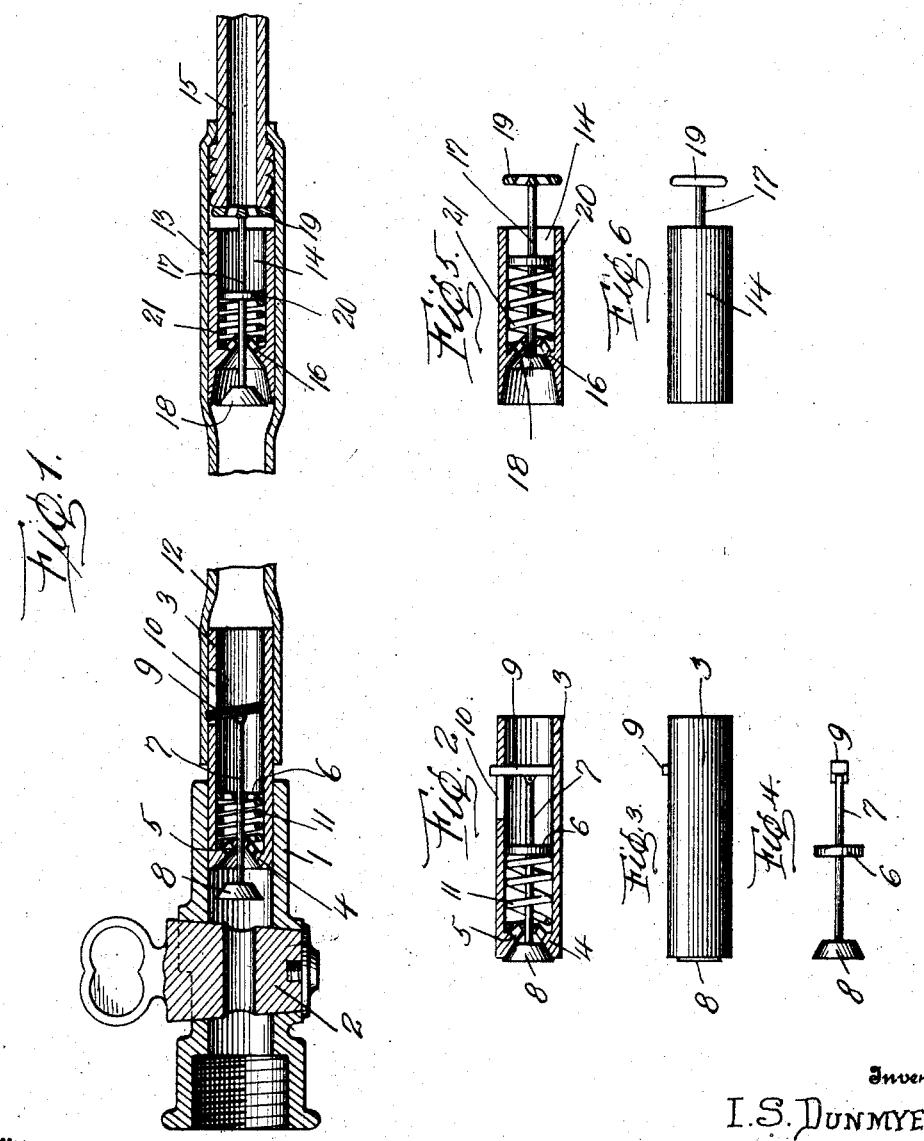

IRA S. DUNMYER, OF CRAFTON, PENNSYLVANIA.

HOSE CONNECTION.

No. 927,336.  Specification of Letters Patent.  Patented July 6, 1909.

Application filed June 12, 1908. Serial No. 438,147.

*To all whom it may concern:*

Be it known that I, IRA S. DUNMYER, a citizen of the United States of America, residing at Crafton, in the county of Allegheny and State of Pennsylvania, have invented certain new and useful Improvements in Hose Connections, of which the following is a specification, reference being had therein to the accompanying drawing.

This invention relates to automatic valves for hose couplings of gas pipes, and the primary object of my invention is to provide a novel valve for automatically shutting off a supply of gas should the hose become accidentally disengaged from the ends of gas pipes.

Another object of this invention is to provide valves that will be opened when the ends of a hose are slipped upon the ends of gas pipes.

A further object of this invention is to provide a simple durable and inexpensive automatic valve that can be used in connection with the present type of hose connection.

With the above and other objects in view which will more readily appear as the invention is better understood, the same consists in the novel construction, combination and arrangement of parts to be hereinafter described and then specifically pointed out in the appended claims.

In the drawings, Figure 1 is a longitudinal sectional view of a gas pipe valve casing or coupling and hose connection equipped with my automatic valves, the hose connection being partly broken away. Fig. 2 is a longitudinal sectional view of one of the automatic valves in a closed position, Fig. 3 is a side elevation of the same, Fig. 4 is a side elevation of a detached valve and valve stem, Fig. 5 is a longitudinal sectional view of another automatic valve forming a part of my invention, and Fig. 6 is a side elevation of the same.

In the accompanying drawings 1 designates a gas supply pipe valve casing or coupling provided with a valve 2 of a well known form, said valve being manipulated by hand to shut off the supply of gas.

In the end of the gas supply pipe 1 is located an automatic valve comprising a cylindrical or tubular body 3 having the inner end thereof formed with a valve seat 4 having openings 5, to permit of gas passing from the valve casing 1 into the valve body 3. In the valve body 3 is slidably mounted a spider bearing 6 having a valve stem 7, said stem extending centrally through the valve seat 4 and longitudinally of the valve body 3. One end of the stem 7 is provided with a valve 8 and the opposite end thereof with a pivoted latch 9; said latch being of a greater length than the diameter of the valve body 3, one end of said latch will protrude through a slot 10 provided in the valve body 3.

Interposed between the spider bearing 6 and the valve seat 4 is a coil spring 11, said spring encircling the stem 7 and normally tending to close the valve 8 and place the latch 9 in the upright position shown in Fig. 2 of the drawings. When the end 12 of a hose is placed upon the protruding end of a valve body 3, the latch 9 is forced inwardly and at an inclination, thereby opening the valve 8 and placing the spring 11 under tension. Should the end 12 of the hose become accidentally disengaged from the valve body 3, the coil spring 11 would immediately close the valve 8 and prevent gas from escaping. The automatic valve used in connection with the opposite end 13 of a hose comprises a cylindrical body 14 located in the hose adjacent to the end thereof, sufficient space being allowed at the end of the hose, whereby the same can be mounted upon the gas outlet pipe 15. The cylindrical valve body 14 is also formed with a valve seat 16, through which passes a valve stem 17 carrying a valve 18, a head 19, and an intermediate spider bearing 20. Interposed between the spider bearing 20 and the valve seat 16 is a coil spring 21. The head 19 is normally held against the gas pipe 15 by the coil spring 21, and should the hose 13 become accidentally disengaged from the pipe 15, the release of the head 19 allows the spring 21 to close the valve 18, consequently, gas cannot escape from the end 13 of the hose.

It is apparent from the novel construction of my automatic valves that positive and reliable means is employed for preventing the escape of gas from a gas supply pipe, should either end of a hose connection be detached, consequently, my invention prevents waste of gas and danger of asphyxiation by the same.

While in the drawings forming a part of this application there is illustrated the preferred embodiments of my invention, I would have it understood that the elements therein can be varied or changed, as to shape, proportion and exact manner of assemblage, without departing from the spirit of the invention.

Having now described my invention what I claim as new, is:—

1. The combination with a coupling, of a tubular body mounted in the outlet end thereof and projecting beyond said coupling and having a slot in said projecting portion, the inner end of said body provided with a valve seat, a spider slidably mounted in said body, a valve stem carried by said spider and projecting on opposite sides thereof, a valve carried on the inner end of said stem, a latch pivoted to the outer end of said stem, with one end projecting through the slot in said tubular body, and a spring between the valve seat and spider for seating the said valve when the latch is released.

2. The combination with a coupling, of a tubular body mounted in the outlet end thereof and provided intermediate its ends at a point outside the coupling with a slot and having a valve seat at its inner end, a hose section having one end sleeved on said tubular body, a spider slidably mounted in said tubular body, a valve stem carried thereby and projecting on opposite sides of the spider, a valve on the inner end of said stem, a latch secured to the outer end of said stem having one end thereof projecting through the slots in said body and engaged by said hose section for normally holding said valve out of engagement with said valve seat, and means for automatically seating the valve when the hose section is disengaged from the tubular body.

In testimony whereof I affix my signature in the presence of two witnesses.

IRA S. DUNMYER.

Witnesses:
   Max H. Srolovitz,
   K. H. Butler.